Patented Mar. 22, 1938

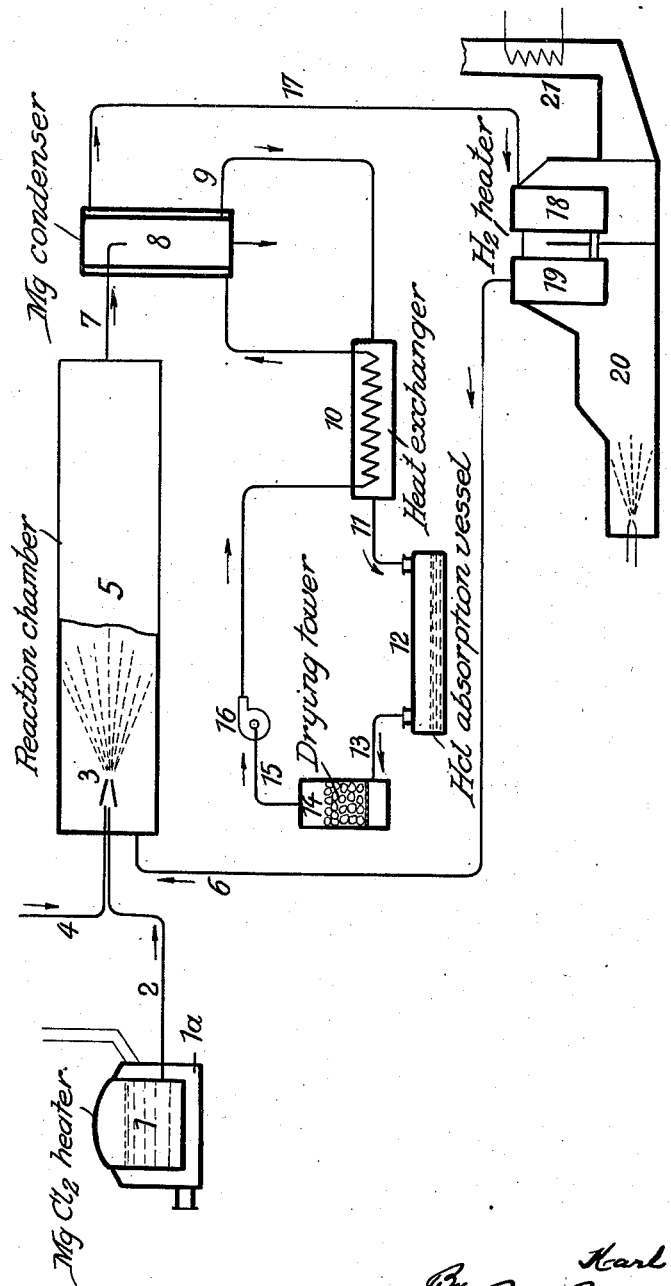

2,111,661

UNITED STATES PATENT OFFICE 2,111,661

PROCESS FOR THE PRODUCTION OF METALLIC MAGNESIUM

Karl Ebner, Oberursel, near Frankfort-on-the-Main, Germany, assignor to American Lurgi Corporation, New York, N. Y., a corporation of New York Application March 5, 1937, Serial No. 129,283 In Germany March 11, 1936

12 Claims. (Cl. 75—67)

Metallic magnesium has been produced commercially heretofore exclusively by fused bath electrolysis. As raw material for this process principally magnesite, dolomite, carnallite, and the magnesium containing waste liquor salts of the potash industry have been used. The process is expensive on account of the high consumption of electric current and electrodes.

It has been proposed to reduce magnesium oxid with carbon in a stream of reducing gas and to reduce magnesium chloride by means of calcium carbide. These processes have, however, not gone beyond the experimental stage.

By the present invention, the difficulties in the metallurgical production of metallic magnesium have been removed. The invention resides in the decomposition of magnesium chloride with hydrogen. This decomposition becomes complete at conveniently attainable temperatures of about 1200 to 1500° C. The reaction produces, besides metallic magnesium in the form of vapor, also hydrochloric acid. Since decomposition of the hydrochloric acid at the temperature necessary for carrying out the process is very small, the yield of magnesium is very high. The magnesium is recovered by condensation from the gaseous products of the reaction leaving a mixture of hydrogen and hydrochloric acid, which hydrogen, after separation of the hydrochloric acid, may be returned to the process.

The magnesium chloride advantageously should be free of water and also free of oxygen containing magnesium compounds and similar oxygen-containing materials because magnesium oxid and such oxygen containing magnesium compounds as are present in the starting material or formed during the treatment are not reduced by hydrogen. For the same reason the hydrogen used in the process should be as free as possible of any impurity which might result in the formation of oxygen containing magnesium compounds such as magnesium oxid.

The process according to the invention advantageously is carried out in such a way that water free magnesium chloride is passed in a finely divided form through a reaction chamber filled with hydrogen. For example, molten magnesium chloride is sprayed or atomized into the reaction chamber with a stream of hydrogen. The reaction chamber is heated to a suitable temperature for the reaction. Heat may be supplied, for example, from an outside source or an excess of hydrogen at a sufficiently high temperature in intimate mixture with the magnesium chloride may be conducted through the reaction chamber. One may, for instance, introduce the hydrogen into the reaction chamber at about 1500–1700° C. in such quantity that the gases leaving the reaction chamber are at a temperature of 1200–1500° C.

Instead of the excess of hydrogen or a part of it, an inert gas, that is, a gas which does not unfavorably influence the decomposition to the production of metallic magnesium, may be employed for conveying heat.

The reaction chamber which may stand vertically, horizontally, or inclined should be of sufficient size and particularly of sufficient length that the decomposition of the magnesium chloride may be as complete as possible. The mixture of magnesium vapor, hydrochloric acid, hydrogen and perhaps also inert gas leaving the reaction chamber is cooled for the condensation and separation of the magnesium. It is delivered into a chamber maintained at the necessary temperature for the condensation of the magnesium, e. g. 900°–600° C., which accumulates therein in molten or powdered form or partly molten and partly powdered.

The gas mixture which remains after the separation of the magnesium can be further treated for the purpose of utilizing its useful constituents. It is, for example, cooled to a temperature between 20° and 200° C. and its hydrochloric acid content recovered in known manner, e. g. by absorption in the form of muriatic acid. The remaining gas consists principally of hydrogen with or without inert gas. This remaining gas may, if desired, after drying and if necessary further purification, be reheated and returned to the reaction chamber.

The heating of the gases necessary for the reduction, or a part of such gases, may be carried out step by step or in stages. For example, the gas first may be brought into heat exchange with the gaseous reaction products which have been freed from magnesium, but still contain hydrochloric acid, and then further heated by heat transfer with the gaseous reaction products for cooling the latter to the temperature necessary for the condensation of the magnesium. The final heating of the gas to the temperature required for introduction into the reaction chamber is accomplished in a special heat exchanger which is directly heated by fire gases. The fire gases after serving to heat the reducing gas to the desired temperature for introduction into the reaction chamber may be utilized in known manner, e. g. for preheating the air used for the production of the fire gases, for the generation of steam, or for heating and melting the magnesium chloride for introduction into the reaction chamber.

If hydrogen or an inert gas is used for atomizing the magnesium chloride it also can be brought to the desired temperature as described or in any other suitable way. It is also possible to use the gas leaving the reaction chamber, after separation of the magnesium and the hydrochloric acid and reheating as the gas for atomizing the magnesium.

If the process is carried out with the gas moving in a continuous cycle losses may be replaced by introducing the corresponding quantity of hydrogen into the cycle before entrance of the gas into the heater or at any other suitable point in the cycle. One may also carry out the process so that more hydrogen than is required for the process is introduced into the circuit at one point and at another point a quantity of gas corresponding to the excess is withdrawn for the purpose of maintaining the difficultly separable impurities at the desired low concentration.

An example of procedure in accordance with the invention will be described in connection with the accompanying drawing which diagrammatically illustrates the essential parts and arrangement of a plant suitable for that purpose.

Referring to the drawing, 1 is a container which may be constructed as a fusing vessel for the anhydrous magnesium chloride, provided with a heating jacket 1a. In order to avoid deterioration of the magnesium chloride, e. g. decomposition with the liberation of hydrochloric acid and formation of magnesium oxychloride, the container 1 is closed and the space above the magnesium chloride is filled with hydrogen or other protecting gas. The molten magnesium chloride is delivered from the container 1 through pipe 2 to the spraying or atomizing nozzle 3. In this nozzle the magnesium chloride is finely subdivided by sufficiently hot hydrogen which is introduced through the pipe 4. The nozzle 3 is positioned, for example centrally, in the rear wall or other suitable location of a horizontal, inclined, or vertical chamber 5. The chamber 5 is supplied with highly heated hydrogen at a temperature of, say, 1600–1700° C. through the pipe 6. The hydrogen mixes with the atomized magnesium chloride and heats it, whereupon it vaporizes and decomposes into its components, magnesium and chlorine. The chlorine unites with a part of the hydrogen, forming hydrogen chloride (hydrochloric acid), so that at the opposite end of the chamber 5 there exists a gaseous mixture of magnesium, hydrogen chloride and hydrogen. This gaseous mixture at a temperature of about 1200–1300° C. passes through the pipe 7 into the cooler 8 where it is cooled to about 1000–600° C. or lower and the metallic magnesium condenses and separates in molten or solid form. The uncondensed gases pass through the pipe 9 to the heat exchanger 10, wherein they are cooled to about 200° C., and then pass through pipe 11 to the device 12 for the separation of hydrogen chloride. This separation may be accomplished by condensation, absorption, or the like.

If the final removal of hydrogen chloride from the gases is accomplished by absorption in water, the hydrogen will take up water vapor and the resulting mixture of hydrogen and water vapor may be dried by passage through pipe 13 and the tower 14 containing, for example, a drying agent such as calcium chloride. The dried hydrogen gas then passes through pipe 15 and blower 16 to the heat exchanger 10, where its temperature is raised from, say 15 to 20° C. to about 200–500° C. It then passes to the cooler 8 where its temperature is further raised to 600–950° C. and then passes through pipe 17 to the heater 18, 19, where its temperature is raised to at least about 1500° C. The heater 18, 19, is heated directly by hot combustion products from the furnace 20. The residual heat in the combustion gases from furnace 20 after passing the heater 18, 19, is recovered in any suitable way diagrammatically illustrated by the coil 21. This recovered heat may serve, for instance, to generate power or heating steam or to heat the magnesium chloride delivered to the vessel 1.

*Example.*—Magnesium chloride at a temperature of 750° C. was delivered at the rate of 100 kg./hr. from the vessel 1 through pipe 2 to the nozzle 3 and hydrogen gas at a temperature of 960° C. was delivered at the rate of 40 m$^3$/hr. to said nozzle. At the same time hydrogen gas at a temperature of 1600° C. was introduced at the rate of 1200 m$^3$/hr. into the chamber 5 through the pipe 6. The reaction gases leaving chamber 5 through pipe 7 at a temperature of about 1300° C. were cooled in the cooler 8 to about 650° C. and metallic magnesium was recovered at the rate of 24 kg./hr. The residual gases at a temperature of about 650° C. were then passed through pipe 9 to the heat exchanger 10 where they were cooled to about 200° C. and then by way of pipe 11 to the condenser 12 from which hydrochloric acid was withdrawn at the rate of about 72 kg./hr. The resulting gases were then dried by contact with calcium chloride in the tower 14 passed through pipe 15 and blower 16 to the heat exchanger 10, where their temperature was raised to about 450° C., thence into the jacket of the cooler 8 where they were heated to about 1000° C., thence by way of pipe 17 to the heater 18, 19, where their temperature was raised to about 1600° C., and finally by way of pipe 6 into the chamber 5. The volumes of gases referred to above are the volumes thereof measured under normal conditions, i. e. at 0° C. and 1 atmosphere pressure.

I claim:—

1. Process for the production of metallic magnesium which comprises reacting magnesium chloride with hydrogen at a high temperature and condensing and separating metallic magnesium from the resulting gaseous reaction products.

2. Process as defined in claim 1 in which the magnesium chloride and hydrogen before being brought into reaction are freed of oxygen compounds.

3. Process as defined in claim 1 in which the magnesium chloride is supplied to the reaction in the form of a water-free melt.

4. Process as defined in claim 1 in which the magnesium chloride is brought into contact with the hydrogen in finely divided form.

5. Process as defined in claim 1 in which the molten anhydrous magnesium chloride is atomized into a reaction chamber containing hydrogen by means of a stream of hydrogen.

6. Process as defined in claim 1 in which at least a part of the heat necessary to maintain the reaction mixture at the high temperature necessary for the reaction is supplied by the introduction of an excess of highly heated hydrogen into the reaction mixture.

7. Process as defined in claim 1 in which an excess of hydrogen is supplied to the reaction mixture, the resulting gaseous reaction products are freed from metallic magnesium and hydrochloric acid, and the resulting purified hydrogen is returned to the reaction mixture.

8. Process as defined in claim 1 in which hydrogen in excess is supplied to the reaction mixture, the resulting hot gaseous reaction products are cooled by heat exchange for the separation of the metallic magnesium therefrom, and eventually reheated and returned to the reaction mixture, at least a part of said reheating of the gases being accomplished by said heat exchange.

9. Process as defined in claim 1 in which hydrogen in excess is supplied to the reaction mixture with the magnesium chloride and the gaseous reaction products are cooled in stages to separate first the metallic magnesium and then the hydrochloric acid content and the resulting hydrogen is reheated in stages and returned to the reaction mixture, one of said cooling and reheating stages being a heat exchange between the gas after separation of the magnesium and the gas after separation of the hydrochloric acid and another of said cooling and reheating stages being a heat exchange between the gases leaving the reaction chamber and the gases after the first named heat exchange.

10. Process as defined in claim 1 in which magnesium chloride and an excess of highly heated hydrogen are supplied to a reaction chamber, the resulting gaseous reaction products are cooled for the separation of metallic magnesium and then further cooled for the separation of hydrochloric acid, then partially reheated by heat exchange with gases which have been freed of magnesium, then further reheated by heat exchange with hot reaction gases containing magnesium issuing from the reaction chamber, and finally heated by heat exchange with fire gases and reintroduced into the reaction chamber.

11. Process as defined in claim 1 in which the gaseous reaction products are freed of hydrochloric acid by contact with water and then dried and returned to the reaction.

12. Process for the production of metallic magnesium which comprises storing molten anhydrous magnesium chloride in an atmosphere of gas free of oxygen, atomizing said magnesium chloride by means of a stream of highly heated hydrogen gas into a reaction chamber, and recovering metallic magnesium from the resulting gaseous reaction products.

KARL EBNER.